United States Patent
Tashjian

(10) Patent No.: US 6,515,223 B2
(45) Date of Patent: Feb. 4, 2003

(54) CELLULAR SHIELD

(76) Inventor: Richard Tashjian, 401 Hasbrouck Blvd., Oradell, NJ (US) 07649

( * ) Notice: Subject to any disclaimer, the term of this patent is extended or adjusted under 35 U.S.C. 154(b) by 0 days.

(21) Appl. No.: 09/877,678

(22) Filed: Jun. 11, 2001

(65) Prior Publication Data

US 2002/0185291 A1 Dec. 12, 2002

(51) Int. Cl.⁷ .................................................. H05K 9/00
(52) U.S. Cl. ............................... 174/35 R; 174/35 MS; 455/90; 455/117
(58) Field of Search .......................... 174/35 R, 35 MS, 174/35 GC; 455/90, 117, 128, 575; 361/816, 818, 799, 800

(56) References Cited

U.S. PATENT DOCUMENTS

| | | | | |
|---|---|---|---|---|
| 5,124,889 A | * | 6/1992 | Humbert et al. | 174/35 R |
| 5,150,282 A | * | 9/1992 | Tomura et al. | 174/35 MS |
| 5,170,173 A | * | 12/1992 | Krenz et al. | 343/702 |
| 5,367,309 A | * | 11/1994 | Tashjian | 343/702 |
| 5,726,383 A | * | 3/1998 | Geller et al. | 174/35 R |
| 5,995,854 A | * | 11/1999 | Wilson | 343/702 |
| 6,341,217 B1 | * | 1/2002 | Wong | 379/446 |

* cited by examiner

Primary Examiner—Dean A Reichard
Assistant Examiner—Carmelo Oliva
(74) Attorney, Agent, or Firm—Richard A. Joel, Esq.

(57) ABSTRACT

A shielding device to protect cellular or cordless telephone users from EMF including the RF microwave radiation comprises a flat internal flexible conductive sheath which is positioned on the top of a flat non-conductive sheathing with a border of non-conductive sheathing extending outwardly thereabout. The sheath assembly is rolled inwardly on both sides and then folded in back on the top and bottom. The recessed are between the rolls of conductive cloth and nylon sheathing is applied thereto. The non-conductive sheathing is cut on both ends of the back region for better audio and the rolls of non-conductive sheathing are trimmed on both sides at an intermediate position. A perforated vinyl/leather front is positioned thereover, hook and loop or Velcro® mounting tabs sewn thereon and a surrounding cover positioned thereover. The cellular or cordless telephone is positioned thereon and the shielding device is wrapped thereabout and locked with an elastic strap, for storage only.

16 Claims, 12 Drawing Sheets

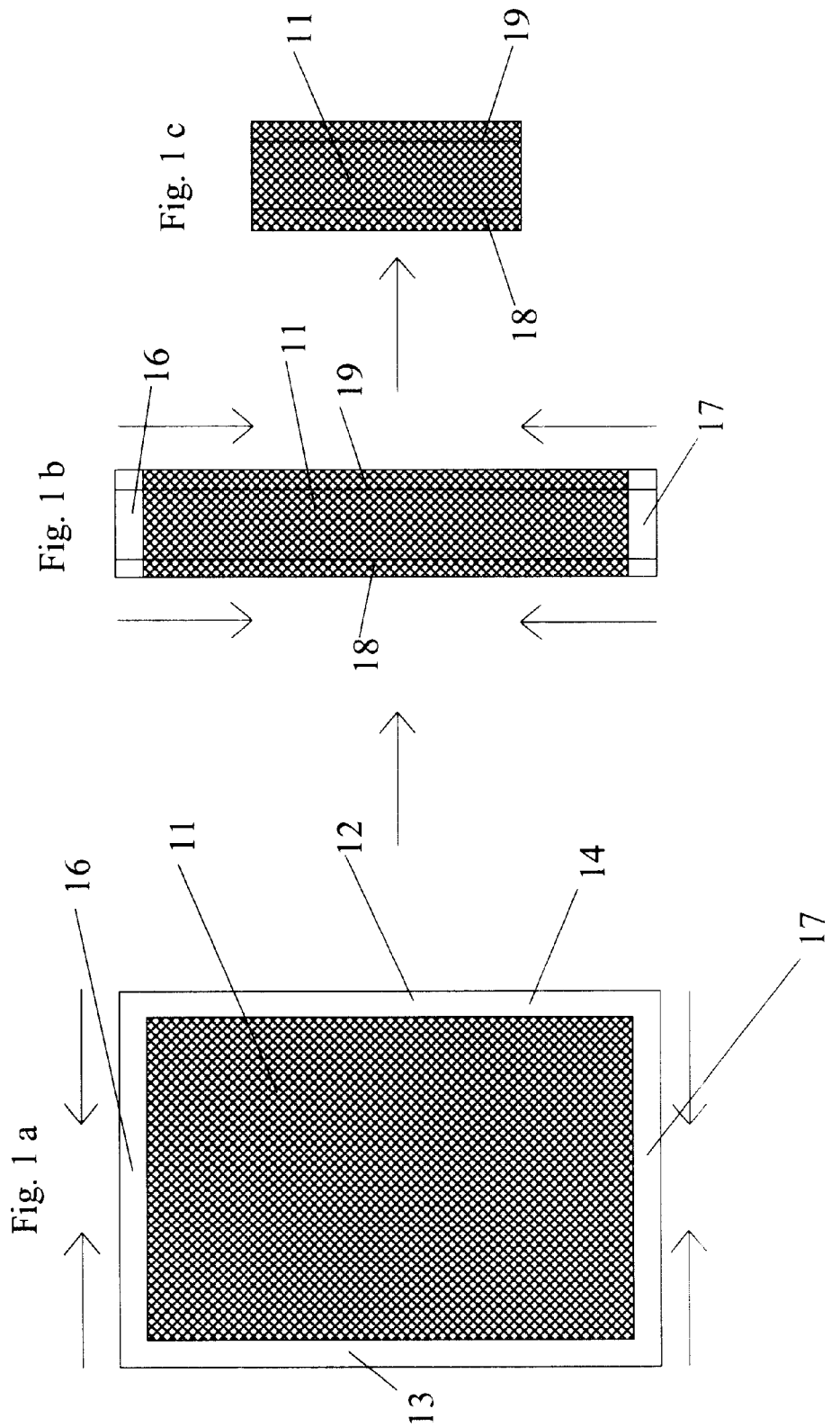

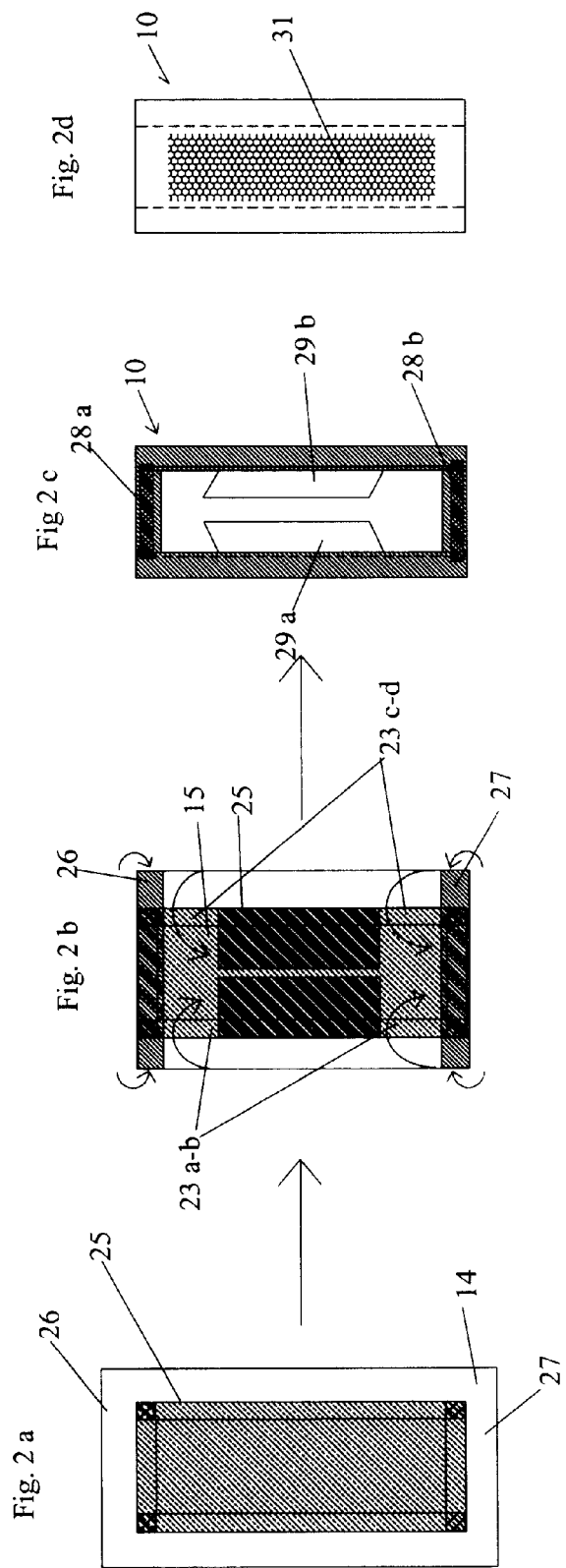

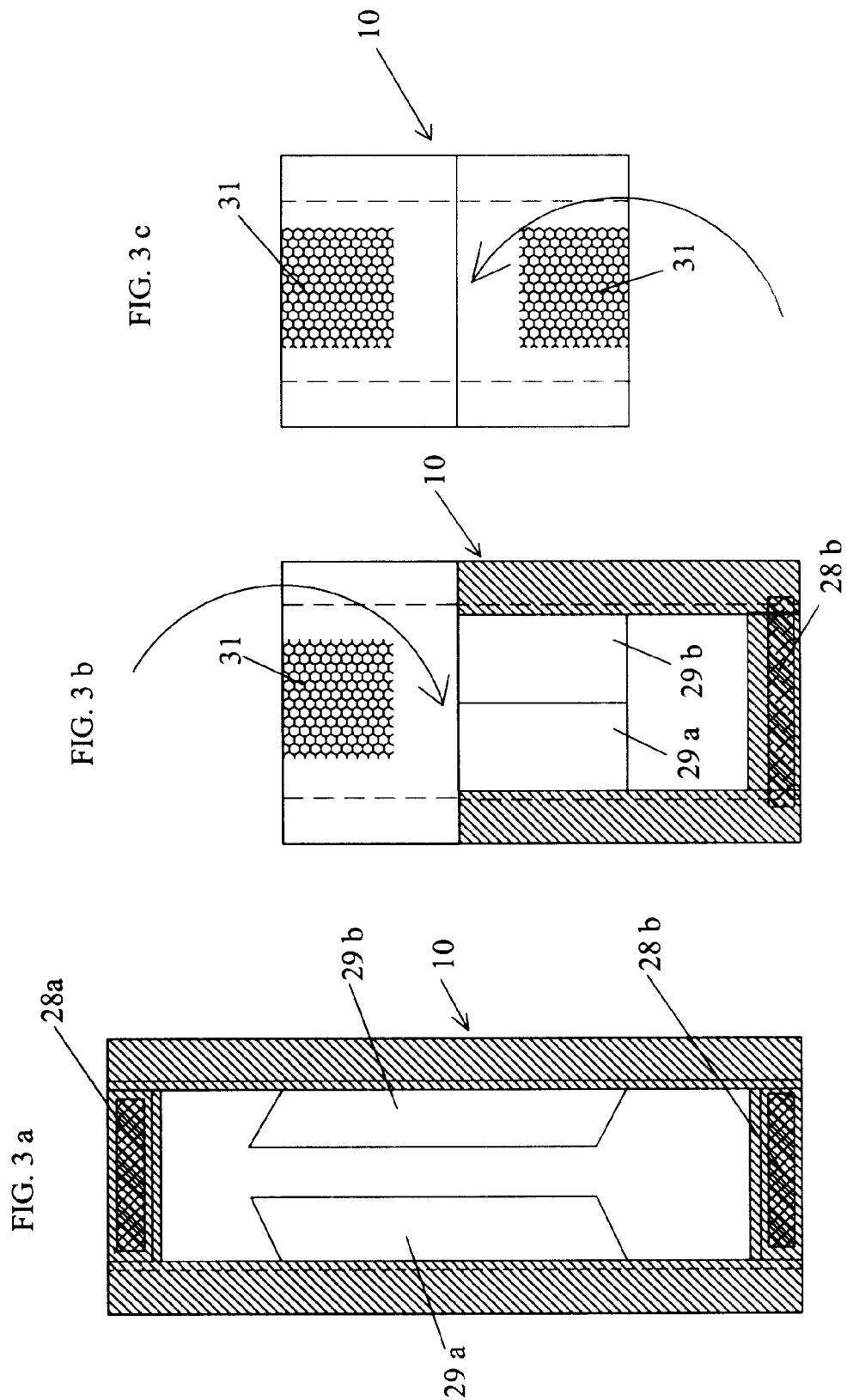

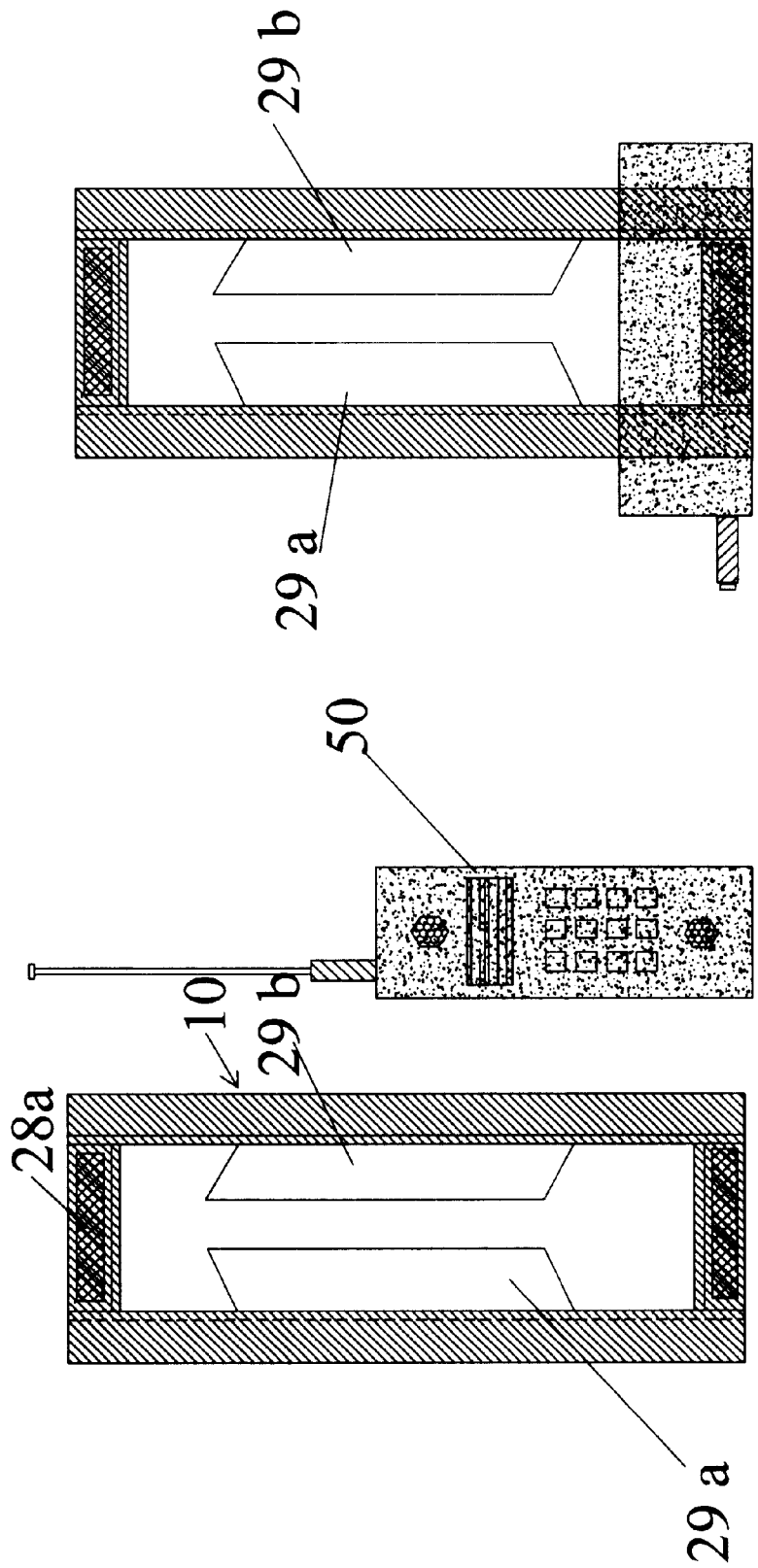

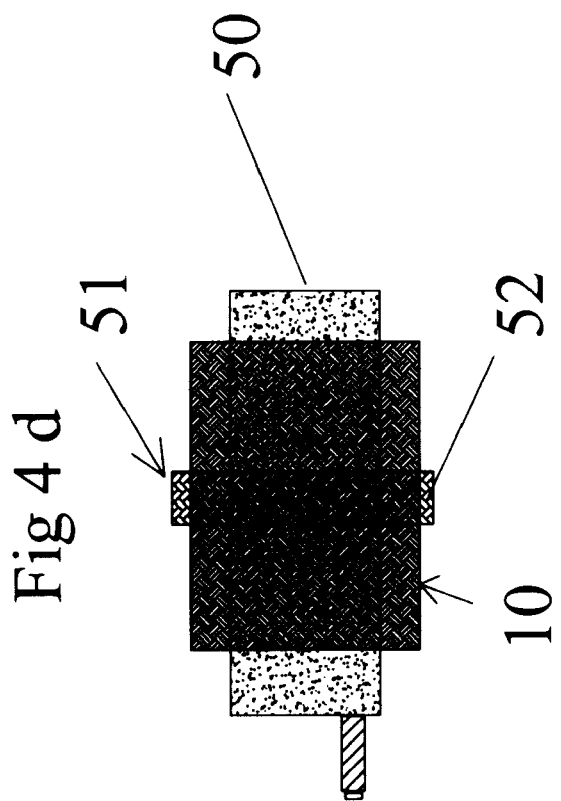
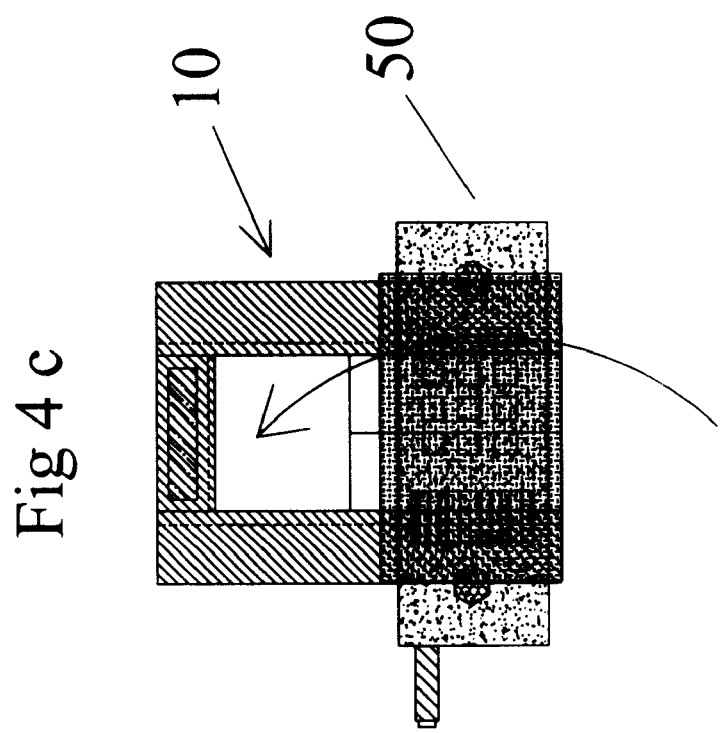

CONDUCTIVE FIBER - SHIELDING EFFECTIVENESS

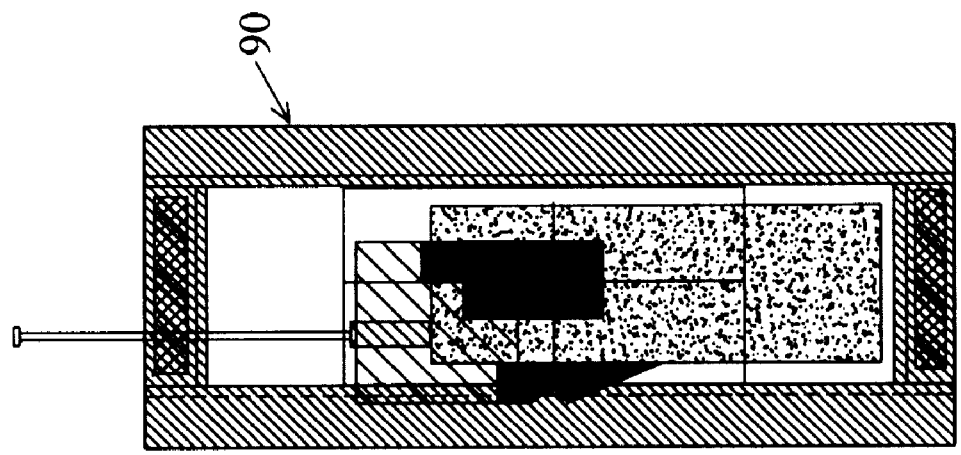
Fig. 7f
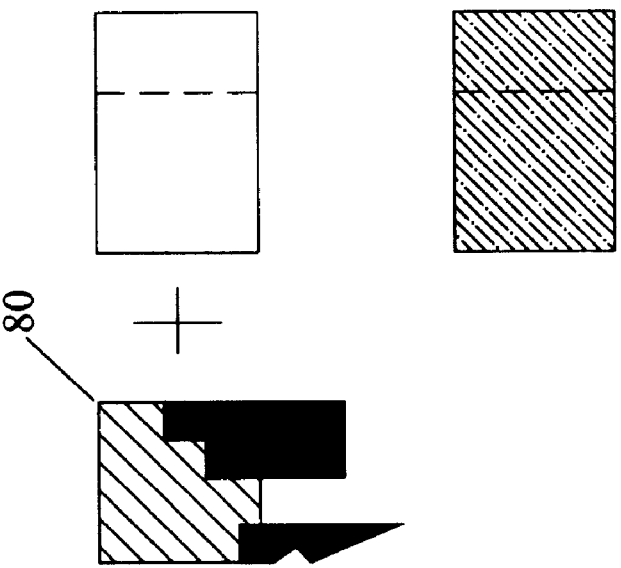
Fig. 7e the sheathing with a border of the non-conductive sheath extending outwardly thereabout. The sheath assembly is then rolled toward midline on both sides to predetermined spaced points forming approximately a 3½ width. The approximate 1" excess (overlapped) non-conductive material is then cut off at the rolled regions only, top and bottom. The middle flap is then folded in onto the conductive fabric and taped at the top and bottom. The non-conductive sheathing is then removed centrally approximately 4½" from mid-point to top and bottom and bilaterally to form rolls (approximately 3"×9" area) for better audio and approximately 2" on top and bottom are then folded in back. Next, these ends are again folded twice outward meeting the end borders on top and bottom. The recessed area between the rolls of conductive cloth has a nylon sheathing applied thereto including a front and back.

CELLULAR SHIELD

STATEMENT REGARDING FEDERALLY SPONSORED RESEARCH OR DEVELOPMENT

Research and development of the present invention and application have not been federally sponsored, and no rights are given under any Federal program.

CROSS-REFERENCE TO RELATED APPLICATIONS

Not applicable.

REFERENCE TO A MICROFICHE APPENDIX

Not applicable

BACKGROUND OF THE INVENTION

Field of the Invention

This invention relates to cellular or cordless telephones and particularly to a shielding assembly, which substantially eliminates microwave radiation from cellular or cordless telephones.

DESCRIPTION OF THE RELATED ART INCLUDING INFORMATION DISCLOSED UNER 37 CFR §§1.97–1.98

This present invention addresses the concerns over possible health hazards caused by the emission of microwave radiation from hand-held cellular or cordless telephones. News media have brought to the public's attention the potential health risks from the exposure of RF microwave radiation to people who use hand-held cellular telephones and the newer cordless telephones. While the debate continues about the danger of microwave emitting telephones held in close proximity to the user's head, the invention protects the user from such radiation and provides peace of mind in this unsettled environment.

The invention protects the user while not disturbing the performance of the telephone's operation due to its unidirectional shielding in use or on standby. The prior art includes applicant's U.S. Pat. No. 5,367,309, which provides a shielding attachment for cellular or cordless telephones and may be used as an optional attachment with this invention. Other patents of interest include U.S. Pat. Nos. 5,124,889; 5,150,282 and 5,170,173 which were cited during the prosecution of applicant's patent.

The prior art also includes telephone cases using the Faraday cage principle, screen patches over the receiver area, clip-on antenna guards, antenna deflection devices and remote handset apparatuses. The present invention in contrast to the prior art shields the user from radiation emitted from both the antenna and telephone regions. The present invention is also versatile and durable to an extent not available in prior art devices. In addition, the cellular shield is inexpensive, simple and easy to use.

SUMMARY OF THE INVENTION

This invention relates to a new and improved shielding device for hand-held cellular or cordless telephones. The device is known as the CELLULAR SHIELD™ and deflects over 99% of the EMF including the RF microwave radiation emitted from the phone and antenna, away from the user.

The shielding device comprises an internal flexible conductive sheath, which is positioned on top of non-conductive sheathing with a border of the non-conductive sheath extending outwardly thereabout. The sheath assembly is then rolled toward midline on both sides to predetermined spaced points forming approximately a 3½ width. The approximate 1" excess (overlapped) non-conductive material is then cut off at the rolled regions only, top and bottom. The middle flap is then folded in onto the conductive fabric and taped at the top and bottom. The non-conductive sheathing is then removed centrally approximately 4½" from mid-point to top and bottom and bilaterally to form rolls (approximately 3"×9" area) for better audio and approximately 2" on top and bottom are then folded in back. Next, these ends are again folded twice outward meeting the end borders on top and bottom. The recessed area between the rolls of conductive cloth has a nylon sheathing applied thereto including a front and back.

The sheathing assembly is positioned over a perforated vinyl/leather front, which is folded in, and clamped together. Next the sides are folded in. Hook and loop or Velcro® centering tabs are mounted on the sides and hook and loop or Velcro® folding tabs are mounted on the top and bottom. Everything is then sewn together by stitching bilaterally ½" in from top to bottom. The top and bottom are folded down to the center on the assembly to mate with the hook and loop or Velcro® centering tabs for storage.

One way to store a cellular or cordless telephone is to place it face down at the bottom back of the shield. The telephone shield is then rolled and wrapped onto the telephone toward the other end. An elastic storage strap is then applied to the wrapped shield enclosing the cellular or cordless telephone. The storage strap can also wrap around a belt loop/belt on the user for easier accessibility.

The cellular shield, when used on hand-held cellular and cordless telephones protects the user from RF microwave radiation and the EMF as well. The cellular shield protects the user from RF microwave radiation emitted from both the telephone's antenna and telephone regions while not affecting the performance of the telephone's operations due to its unidirectional shielding as well as by physically blocking contact of the user's head with the phone and/or antenna. The cellular shield is simple in design and easy and fast to use. The invention also has the advantages of versatility and durability since one size fits all telephone types. Further, the shield is simple in design and easy to use. Applying the shield, removing it from the telephone and storing takes only seconds. Additionally, one-size fits all telephone types although a compact version is available for telephones less than 6" in length.

Accordingly, an object of this invention is to provide a new and improved radiation shield for cellular or cordless telephones.

Another object of this invention is to provide a new and improved cellular shield, which deflects the emitted microwave radiation from a cellular or cordless telephone away from the user, as well as, by physically blocking contact of the user's head with the phone and/or antenna, absorbs the balance as heat and also reduces the total EMF generated from the telephone.

A further object of this invention is to provide a new and improved cellular shield, which includes conductive and non-conductive sheaths, which are rapidly assembled and placed in front of a cell telephone to eliminate microwave radiation and the EMF.

Another still further object of this invention is to provide a new and improved cellular shield, which includes an inner conductive sheath, mounted to an outer non-conductive sheath surrounded by a perforated vinyl/leather cover and including hook and loop or Velcro® fasteners to hold the telephone within the covering assembly.

A more specific object of this invention is to provide a versatile, durable and easy to use shield to protect a cellular or cordless telephone user from microwave radiation which includes an inner conductive sheath mounted to an outer non-conductive sheath folded into an assembly having a back nylon lining as sheathing and a perforated leather front applied thereto and hook and loop or Velcro® tabs mounted thereto, all to be folded in a specific arrangement to encompass a cellular or cordless telephone.

BRIEF DESCRIPTION OF THE DRAWINGS

The above and other objects and advantages of this invention may be more clearly seen when viewed in conjunction with the accompanying drawings wherein:

FIGS. 1a–1e we represent a top view flow chart showing the initial assembly of the cellular shield with:

FIG. 1a showing the conductive sheath positioned on top of the non-conductive sheathing;

FIG. 1b showing the folding of the sheath in FIG. 1a;

FIG. 1c showing the folding of the sheathing in FIG. 1b from the top and bottom;

FIG. 1d showing nylon sheathing wrapped around the conductive cloth and being tucked under the rolled edges bilaterally; and, FIG. 1e showing the non-conductive ends trimmed in a back view;

FIGS. 2a–2d are a top view flow chart showing the second stage in the assembly of the cellular shield with:

FIG. 2a showing a perforated vinyl/leather front mounted over the shield exterior;

FIG. 2b showing the vinyl/leather front folding in and mounted at the top and bottom;

FIG. 2c showing a back view of FIG. 2d; and,

FIG. 2d showing a front view of the shield shown in FIG. 2b;

FIG. 3a shows a back view of the cellular shield with hook and loop or Velcro® storage tabs;

FIG. 3b depicts folding the top/bottom to the enter onto hook and loop or Velcro® centering tabs; and;

FIG. 3c depicts folding the other end to center onto hook and loop or Velcro® centering tabs;

FIGS. 4a–4d depict storage of the cellular shield in a flow chart in a different manner than depicted in FIGS. 3a–3c;

FIGS. 7a–7f depict the use of a shielding applicator together with the cellular shield flow chart.

DETAILED DESCRIPTION OF THE INVENTION

Figure 1E:
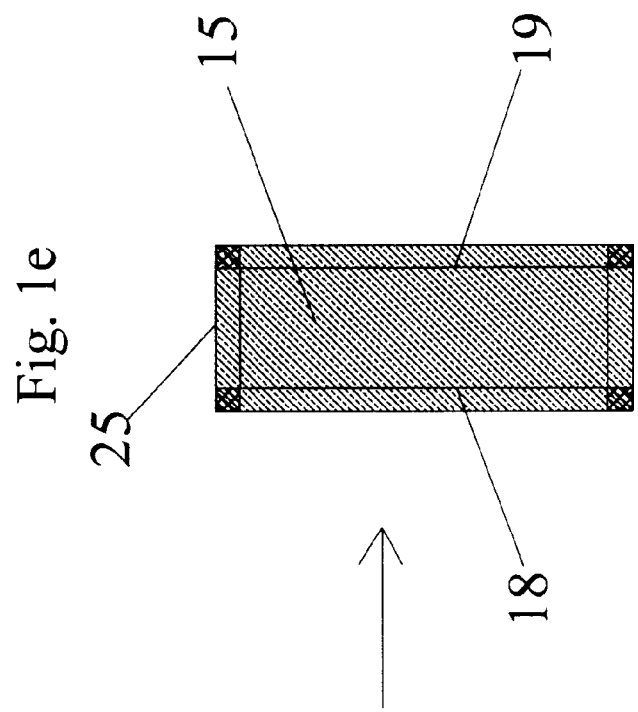
Figure 1D:
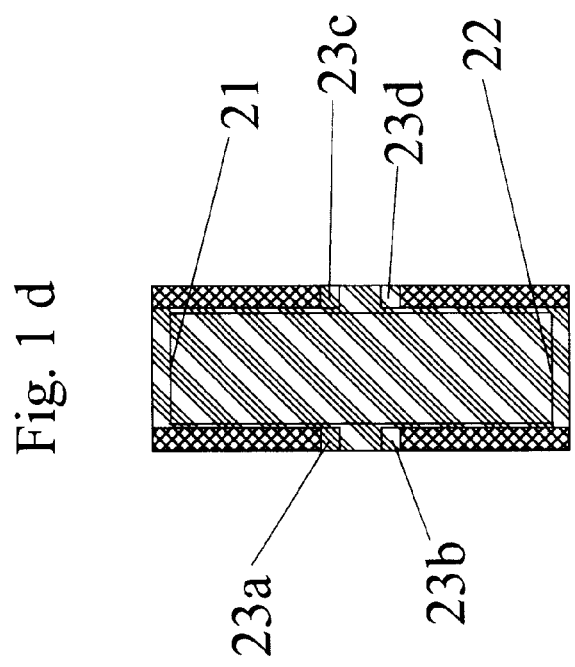

Referring now to FIG. 1 of the drawings, the invention comprises a cellular shield 10 to protect the user from the RF microwave radiation from cellular or cordless telephones 50. The shield 10 is assembled as shown in FIGS. 1a–1e and FIGS. 2a–2d. A conductive cloth 11 is positioned on top of a non-conductive sheath 12 with approximately a one-inch border comprising 13, 14, 16 and 17 about the periphery. The cloth 11 is approximately eleven by fourteen inches while the sheath 12 is approximately thirteen by sixteen inches in a standard version.

The Cellular Shield™ 10 is rectangular in shape and is approximately 3.5 inches wide by and 9.5 inches high for the standard version and 3.5 inches wide by 8.0 inches high for the compact version with a central thickness of approximately 1/16 inch and a side thickness of approximately 1/8 inch. The internal flexible conductive fabric 11 comprises a copper, and polyester blend which is folded as noted in FIGS. 1a–1c with a non-conductive material 12, then wrapped with a nylon fabric 15 and sewn together with the outer leather covering 12 and perforated hook and loop or Velcro® centering tabs 29a, 29b, giving the Cellular Shield™ 10 its unique shielding effectiveness of over five times its original area. The shield 10 weighs only 1.6 ounces or 45 grams. The shielding effectiveness is shown in the charts of FIGS. 7 and 8.

Both sides 13 and 14 in FIG. 1a are rolled in towards the midline to approximately 3½ inches in width. Next, as shown in FIG. 1b, the top 16 and bottom 17 are folded in back to produce the 3½ by sixteen-inch assembly shown in FIG. 1c. A nylon sheath 15 is wrapped about the conductive cloth 11, front and back, and is tucked under the rolled edges 18 and 19, see FIG. 1d. FIG. 1d shows the non-conductive sheathing cut on both ends 21 and 22 of the back region for better audio while the ends of the non-conductive sheathing 23a–d are trimmed.

The perforated hook and loop or Velcro® centering tabs 29a, 29b are perforated for several reasons:

1. Better dexterity while holding the telephone;
2. Better audio when using optional shielding applicator attachment;
3. If all else fails—you can apply the shield directly to telephone, using the pressure of the telephone against your head to hold it in place. In this situation, the perforated hook and loop or Velcro® holding tabs, also allows for better audio.

FIGS. 2a–2d represent a second stage in the assembly of the Cellular Shield 10. A perforated leather/vinyl layer 14 of approximately six inches by 12 inches has the assembly 25 of FIG. 1e positioned thereover. The top 26 and bottom 27 are folded inwardly as shown in FIG. 2b and mounted to the assembly 25.

FIG. 2c shows a back view with hook and loop or Velcro® folding tabs 28a, 28b at the top and bottom respectively and perforated hook and loop or Velcro® centering tabs 29a, 29b on the sides. FIGS. 2d shows the front of FIG. 2c with perforations 31.

FIG. 3a is an enlarged view of FIG. 2c while FIG. 3b shows folding the top down in the direction of the arrow so that the hook and loop or Velcro® fastener 28a secures the upper portion to the fasteners 29a, 29b. FIG. 3c illustrates how the bottom with fastener 28b is folded upwardly in the direction of the arrow to mate with fasteners 29a, 29b. This is one way of storing the cellular shield.

FIG. 4a depicts the shield 10 and cellular or cordless telephone 50 with the telephone 50 placed face down on the bottom back of the shield 10 as in FIG. 4b. The shield 10 is then wrapped about the telephone 50 as in FIG. 4c resulting in the assembly 51 of FIG. 4d which is held is place by the elastic storage strap 52. This is another way of storing the cellular shield. An elastic storage strap can also wrap around the belt/belt loop for storing on a belt.

The Cellular Shield™ 10 is approximately 3.5 inches wide and 9.5 inches high in the standard version described above. A compact version of the shield 10 is 3.5 inches wide by 8 inches high with both versions having the same thickness ranging from 1/16" to 1/8". Weight of the standard version is approximately 1.6 ounces while the compact version is approximately 1.3 ounces. The shield 10 as thus shown drastically minimizes the EMF including the RF microwave radiation emitted from the telephone and prevents it from reaching the user.

Figure 5:
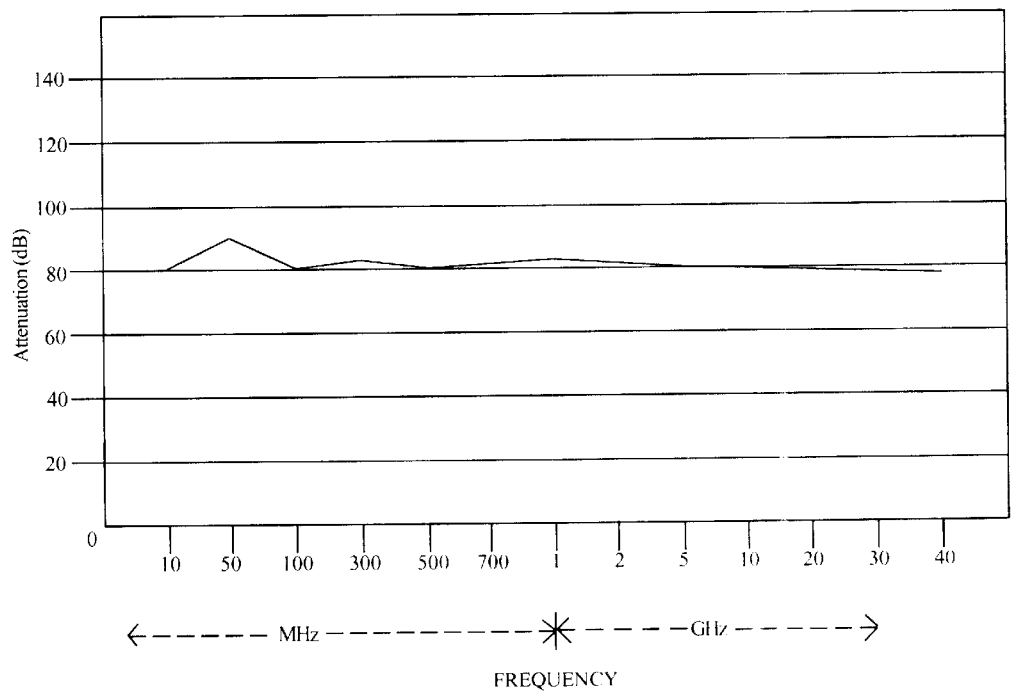
FIG. 5 depicts a chart showing shielding effectiveness in frequency versus attenuation.
Figure 6:
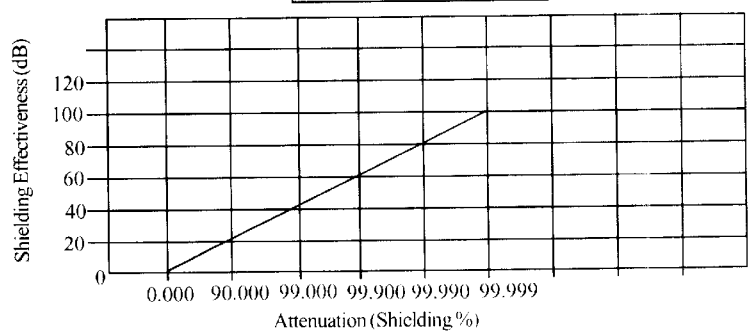
FIG. 6 shows attenuation (shielding %) versus shielding effectiveness.

FIG. 5 is a chart showing shielding effectiveness in frequency versus attenuation. Noticeably, the attenuation in dB is almost constant at 80 dB. In FIG. 6 the attenuation in shielding % increased to 100% as the dB rises to 100 dB. This sows the effectiveness of the shield 10.

Figure 7D:
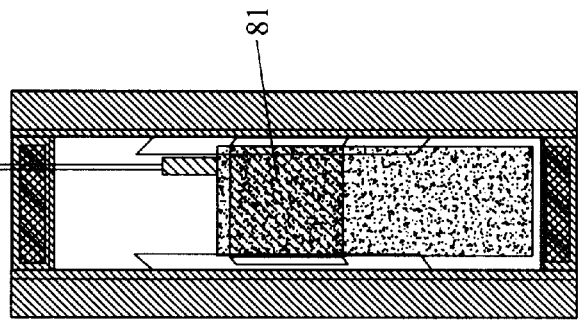
Figure 7C:
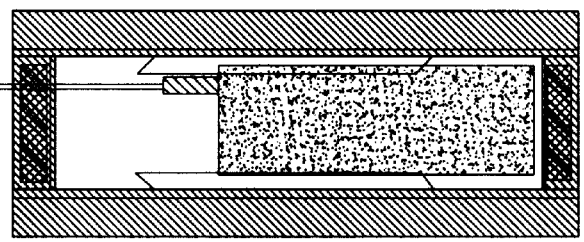
Figure 7B:
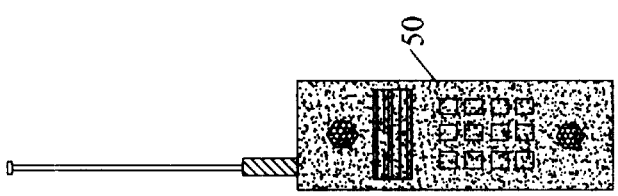
Figure 7A:
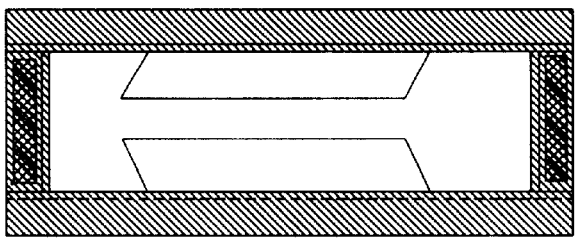

FIG. 7a shows the cellular shield 10 with the shielding attachment 80. FIG. 7b depicts a rear view of the cellular shield 10 into which the cellular phone 50 is positioned as shown in FIG. 7c. The telephone is held in place by the elastic holding strap 81. The holding strap 81 slides into the applicator 80 and shield 10 resulting in the assembly 90 shown in FIG. 7f. The assembly 90 provides additional radiation protection.

Figure 8A:
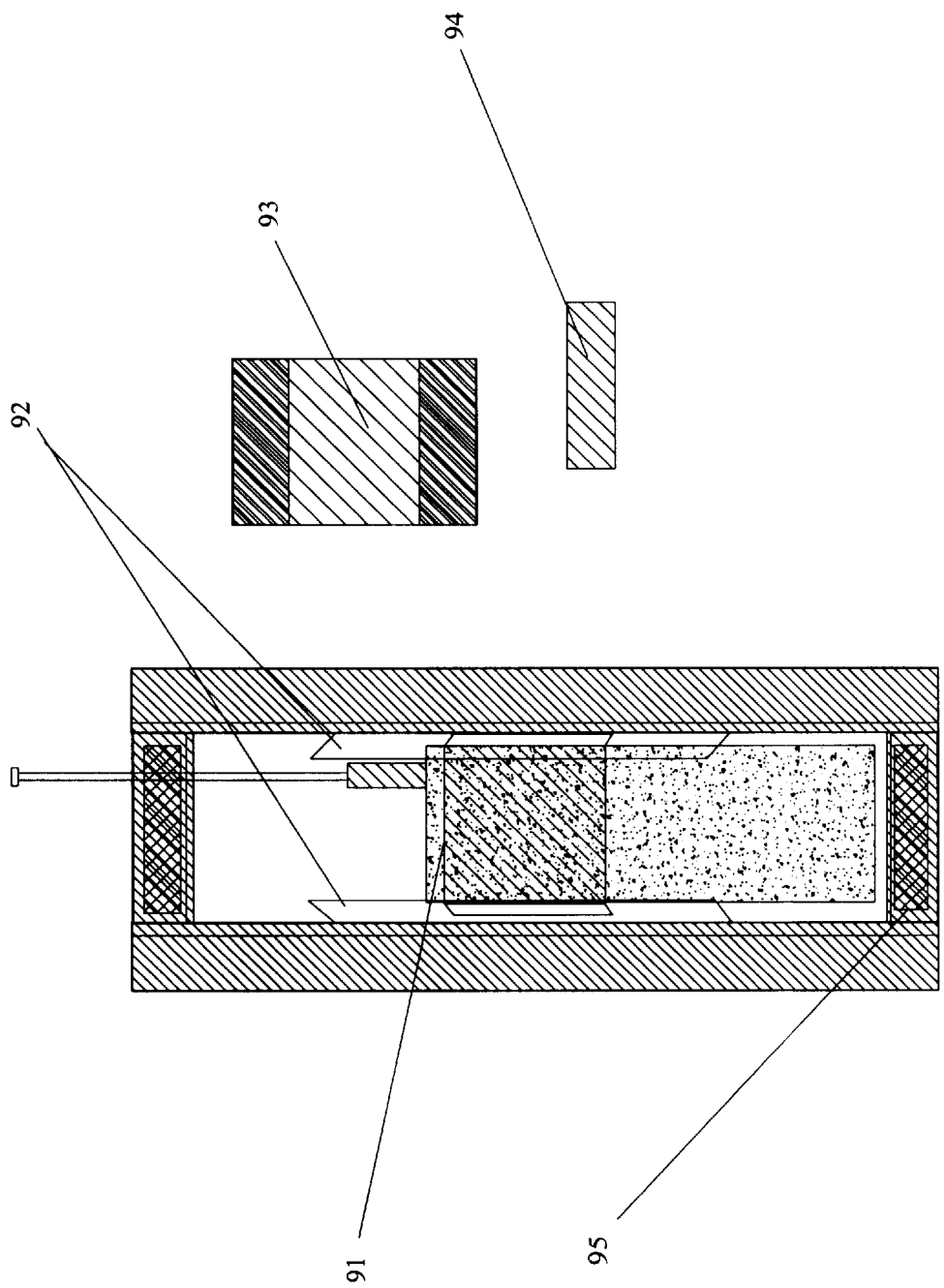
FIGS. 8A–C depict a pouch type configuration of the cellular shield using elastic holding straps and hook and loop fasteners.
Figure 8B:
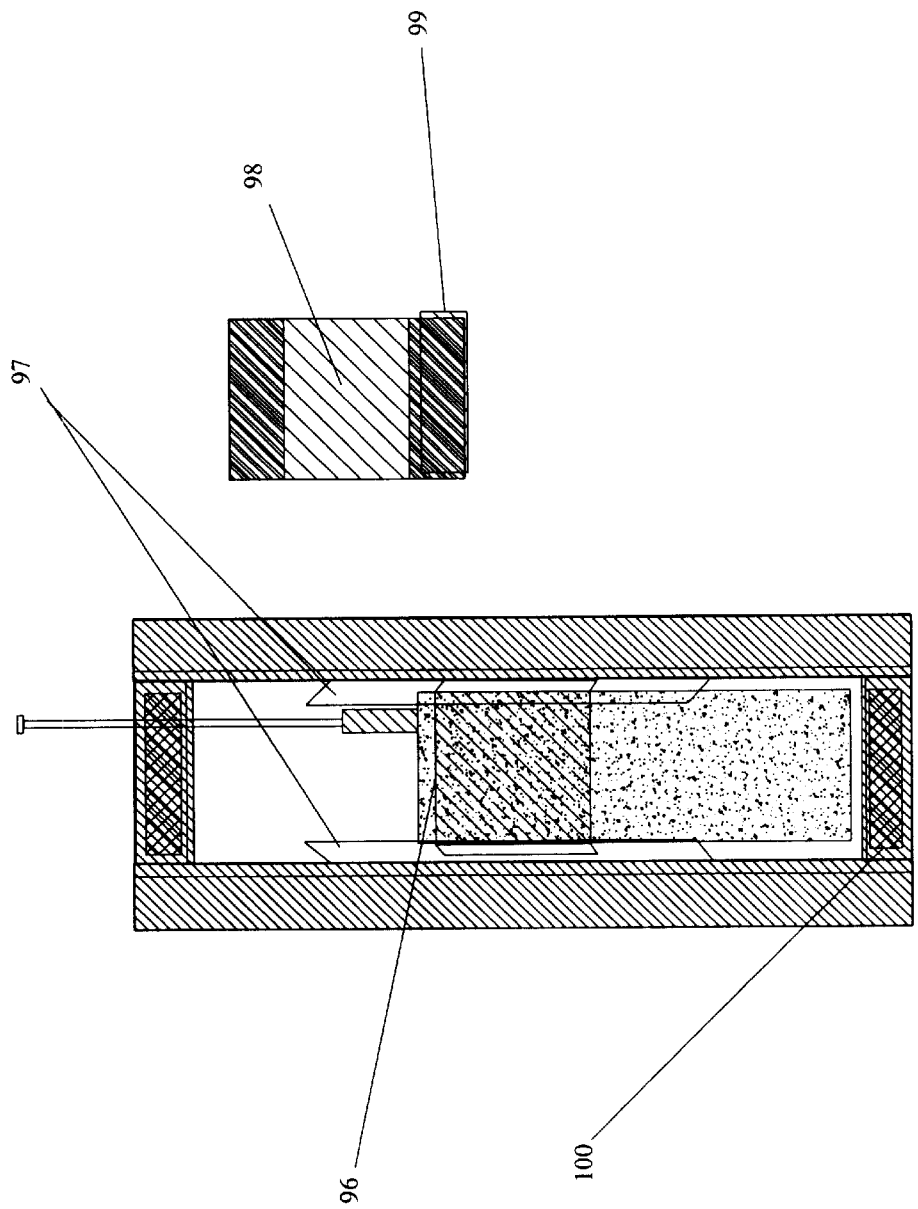
Figure 8C:
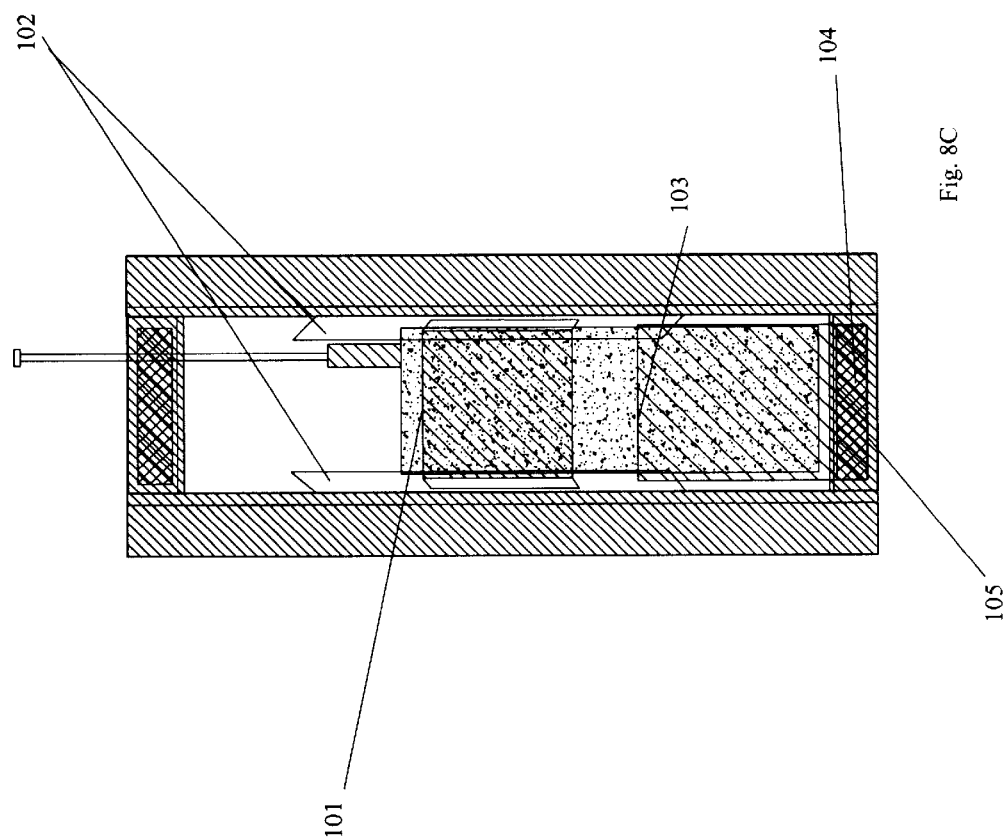

Referring to FIGS. 8a–c, a pouch type of configuration may be formed by the use of two elastic holding straps 91, 93 and a hook and loop or Velcro® conversion tab 94. A small elastic holding strap is designated as 93 while medium elastic holding strap is designated as 91 in FIG. 8a. The straps 91, 93 cooperate with the perforated hook and loop or Velcro® centering tabs 92 and storage tab 95.

In FIG. 8b, the hook and loop or Velcro® conversion tab 99 engages the small elastic holding strap 98. A medium elastic holding strap 96, storage tab 100 and perforated hook and loop or Velcro® centering tabs 97 are also indicated. FIG. 8c shows the hook and loop or Velcro® conversion tab 104 mounted over the storage tab 105 with the small elastic strap 103 connected thereto. The medium strap 101 and hook and loop or Velcro® tables 102 are also shown.

The conversion tab is simply a loop or Velcro® folded in half and then sewn on one side (see 94) in FIG. 8a. This converts hook to loop. By placing the conversion tab 99 on one end of the elastic holding strap 98 (see FIG. 8b), this allows it to stick to the lower hook and loop or Velcro® storage tab 105 on one end while attaching to the lower portion of the hook and loop or Velcro® centering tabs 102 on the other end as shown in FIG. 8c.

While the invention has been explained by a detailed description of certain specific embodiments, it is understood that various modifications and substitutions can be made in any of them within the scope of the appended claims, which are intended also to include equivalents of such embodiments.

What is claimed is:

1. A shielding device for telephones emitting EMF including RF radiation to protect users comprising
   a non-conductive sheathing having a substantially rectangular configuration including a pair of elongated sides and a smaller top and smaller bottom;
   a conductive sheathing positioned partially over said non-conductive sheathing, said conductive sheathing being rolled inwardly with the non-conductive sheathing at both sides to a predetermined point and folded inwardly at top and bottom, said sides comprising a substantially cylindrical wrapped body having the non-conductive sheathing on the exterior thereof, said folded sheathing functioning equivalent to a larger sheathing area;
   a nylon sheathing positioned over the conductive sheathing and mounted under the rolled cylindrical body on said sides, said non-conductive sheathing being removed on one side at top and bottom for better audio;
   said non-conductive sheathing, conductive sheathing and nylon sheathing forming a sheathing assembly;
   a rectangular sheet of perforated material being positioned adjacent the sheathing assembly, said sheet being folded inwardly and fastened at the top and bottom to the sheathing assembly; and,
   hook and loop centering tabs being mounted to the sheathing assembly on each side and sewn together by two bilateral stitches at a predetermined distance in from sides, top to bottom; and
   hook and loop elastic holding straps being mounted on the upper and lower portions of the sheathing assembly to engage the centering tabs and said upper and lower straps being folded downwardly in use for storing the cellular shield.

2. A shielding device for telephones emitting RF radiation in accordance with claim 1 wherein:
   the conductive sheathing comprises conductive cloth sheathing and the non-conductive sheathing extends beyond the conductive sheathing on all sides, forming a uniform border of non-conductive cloth.

3. A shielding device for telephones emitting RF radiation in accordance with claim 1 wherein:
   the rolled cylindrical body is trimmed at an intermediate point on both sides to facilitate folding of the sheathing assembly.

4. A shielding device for telephones emitting RF radiation in accordance with claim 1 wherein:
   the hook and loop centering tabs comprise substantially rectangular tabs, each pivotally affixed along one side to the cylindrical wrapped body and having the opposite side in juxtaposition to the other tab.

5. A shielding device for telephones emitting RF radiation in accordance with claim 1 further including:
   an elastic storage strap that surrounds the shielding device to maintain said device in position about a telephone.

6. A shielding device for telephones emitting RF radiation in accordance with claim 1 wherein:
   the hook and loop folding tabs on the upper and the lower portions of the sheathing engage the centering tabs for storage.

7. A shielding device for telephones emitting RF radiation in accordance with claim 1 wherein:
   the conductive cloth comprises a copper, polyester blend, said cloth being light and flexible.

8. A shielding device for telephones emitting RF radiation in accordance with claim 1 wherein:
   the conductive cloth is approximately eleven by fourteen inches while the non-conductive sheath is approximately thirteen by sixteen inches.

9. A shielding device for telephones emitting RF radiation in accordance with claim 1 wherein:
   the shielding device is rectangular in shape and 3.5 inches wide by 8 inches long (compact version) before wrapping about a telephone.

10. A shielding device for telephones emitting RF radiation in accordance with claim 1 wherein:
    the shield device is rectangular in shape and 3.5 inches wide by 9.5 inches long (standard versions) before wrapping about a telephone.

11. A shielding device for telephones emitting EMF including the RF radiation in accordance with claim 1 wherein:

the conductive sheathing diverts substantially all of the RF radiation from the user by shielding it from the user, as well as, physically blocking any possibility of contact with the user's head with phone and/or antenna.

12. A shielding device for telephones emitting EMF including the RF radiation in accordance with claim 1 wherein:

the hook and loop elastic holding straps vary in size depending on the type of telephone to which the shield is applied.

13. A shielding device for telephones emitting EMF including the RF radiation in accordance with claim 1 wherein:

the perforated hook and loop centering tabs and elastic holding strap, where applicable, holds the telephone within the shield.

14. A shielding device for telephones emitting EMF including the RF radiation in accordance with claim 1 wherein:

the shield is placed in front of the phone allowing the pressure of the phone against the user to hold said shield in place thereby protecting the user against the EMF generated by the phone.

15. A shielding device for telephones emitting EMF including the RF radiation in accordance with claim 1 further including:

a hook and loop conversion tab forming a pouch type configuration for usage in cooperation with the elastic holding straps.

16. A shielding device for telephones emitting EMF including the RF radiation in accordance with claim 15 wherein:

the hook and loop conversion tab comprises a Velcro® loop folding in half and sewn together on one side.

* * * * *